United States Patent [19]

Blumenkranz

[11] 4,436,988
[45] Mar. 13, 1984

[54] SPIRAL BIFILAR WELDING SLEEVE

[75] Inventor: James J. Blumenkranz, Hollywood, Calif.

[73] Assignee: R & G Sloane Mfg. Co., Inc., Sun Valley, Calif.

[21] Appl. No.: 353,158

[22] Filed: Mar. 1, 1982

[51] Int. Cl.³ .............................................. H05B 3/44
[52] U.S. Cl. .................................. 219/544; 174/47; 156/244.12; 156/169; 156/275.1; 219/528; 219/535; 219/541; 285/21
[58] Field of Search ............... 219/200, 522, 535, 528, 219/530, 541, 544, 549; 156/158, 195, 169, 275, 244.2, 294, 304.1, 304.6, 544; 285/21, 417; 264/272; 338/63; 174/47

[56] References Cited

U.S. PATENT DOCUMENTS

| 2,930,634 | 3/1960 | Merritt | 156/275 |
| 3,061,503 | 10/1962 | Gould | 285/21 |
| 3,062,940 | 11/1962 | Bauer | 285/417 |
| 3,094,452 | 6/1963 | von Riegen | 156/275 |
| 3,378,672 | 4/1968 | Blumenkranz | 219/200 |
| 3,506,519 | 4/1970 | Blumenkranz | 156/275 |
| 3,542,402 | 11/1970 | Caples | 285/21 |
| 3,788,928 | 1/1974 | Wise | 156/294 |
| 3,969,170 | 7/1976 | Landgraf | 156/158 |
| 4,167,645 | 9/1979 | Carey | 174/47 |
| 4,176,274 | 11/1979 | Lippera | 219/544 X |
| 4,277,640 | 7/1981 | Kutnyak et al. | 174/47 |
| 4,370,548 | 1/1983 | Nagasawa et al. | 219/544 X |

FOREIGN PATENT DOCUMENTS

| 5083152 | 1/1977 | Japan | 285/21 |
| 809560 | 2/1959 | United Kingdom . | |

Primary Examiner—Volodymyr Y. Mayewsky
Attorney, Agent, or Firm—Fulwider, Patton, Rieber, Lee & Utecht

[57] ABSTRACT

A bifilar resistance element for use in preparing heating elements used in thermal bonding and the like, wherein two electrically conducting wires are embedded in a thermoplastic sheath which is fusible when sufficient current is passed through the bifilar resistance element. A heating element is prepared by joining the pair of wires in a length of the bifilar resistance element together at one end to form an electrically conductive path and then winding the length into a spiral shape. Two articles of thermoplastic material may be bonded together by placing the heating element in a recess simultaneously adjacent both articles with a pair of leads to the heating element extending externally from the two articles to be bonded, and applying an electrical current so that the thermoplastic sheath and a portion of the adjacent articles themselves are fused, to bond the articles together upon cooling.

13 Claims, 3 Drawing Figures

SPIRAL BIFILAR WELDING SLEEVE

BACKGROUND OF THE INVENTION

This invention relates generally to the joining of articles by a fusible filler material, and more particularly, to an economically manufactured resistance element which may be placed in a cavity between two articles to be joined and then fused to form a bonding medium by heat generated on the passage of an electrical current through the resistance element.

Thermoplastics are widely used construction materials for a variety of articles, including pipes and fittings, due to their corrosion resistance, light weight, ease of handling, fabricability and relatively low cost. A variety of joining techniques have been developed to broaden the range of usefulness of thermoplastic articles. Mechanical joining techniques such as threaded joints and flange connections require specialized parts and sometimes laborious assembly, and in many cases may not be sufficiently fluid tight for pressurized piping systems. In chemical joining techniques such as solvent welding, a solvent is applied to the surface of the parts to be joined, and the parts are placed in contact before the dissolved portion solidifies, thereby producing a sound, water tight joint. However, chemical joints are sometimes not feasible because the articles must be placed in contact immediately after the application of the solvent. Additionally, some types of thermoplastic materials are highly resistant to conventional, safely usable solvents.

The thermal bonding technique for joining thermoplastic materials utilizes heat to fuse a fusible filler material and preferably a portion of the articles to be joined themselves, so that after cooling the articles are joined by a sound, fluid tight, sealed joint. In a typical application of thermal bonding to join a water pipe and a fitting, an annular recess is provided in the fitting simultaneously adjacent the inner wall of the fitting and the outer wall of the pipe to be joined. A heated coil comprising an electrical conductor covered by a fusible thermoplastic material is inserted into the recess, the pipe is placed within the heating coil so that the heating coil is positioned between the inner wall of the fitting and the outer wall of the pipe, and an electrical current is passed through the electrical conductor to heat and fuse the thermoplastic material and adjacent portions of the walls of the fitting and the pipe. During cooling, a bond forms between the fitting and the pipe.

The primary requirements for a heating element are the provision of an electrically conductive path in a wire which will be heated with the passage of a current, a geometry which makes the wire leads externally accessible, the introduction of a thermoplastic filler material into the region of the bond, and, preferably, a structure which allows the heating element to be readily and economically fabricated. In one approach to a cylindrical heating element, a wire is doubled and wound pairwise onto a thermoplastic core and then covered with a thermoplastic coating, but this heating element is cumbersome to produce in mass quantities and somewhat restricted in use. In another approach, a single conductive wire is covered with a thermoplastic coating serving both as insulation and as a filler in the joint, and wound into a spiral heating element. External accessibility of both wire leads is accomplished by crossing one end over the would coil, but this design is inconvenient to fabricate and may result in an electrical short, and the crossover is found to be a potential point of leakage of fluid through the joint in pressurized systems. Yet other designs for heating elements have been tried, but none have met the requirements set forth above, and in particular these designs usually require costly hand layup or handling during fabrication.

Accordingly, there has been a need for an approach to fabricating heating elements for joining thermoplastic materials such as pipes and fittings, which is both convenient to use and economical. The present invention fulfills this need, and further provides related advantages.

SUMMARY OF THE INVENTION

The present invention provides a construction for a resistance element which may be fabricated by conventional technology into long lengths, and then conveniently fabricated into a heating element for use in joining two articles by thermal bonding. The bifilar resistance element incorporates two electrically conductive wires within a thermoplastic sheath so that a completed electrical circuit may be made at a point remote from the input leads simply by stripping the thermoplastic sheath from the pair of embedded wires and then joining the wires by means allowing electrical conduction between the wires. The bifilar resistance element is then formed into a heating element shaped, for example, as a spiral. If desired, a particular fabricated shape for the heating element may be retained by bonding adjacent portions of the heating element so as to form a self-sustaining structure which may be moved without disrupting the pattern into which the heating element is formed. With this invention, heating elements for thermal bonding may be fabricated quickly and economically by automated operations in a variety of self-sustaining shapes and sizes from a single kind of starting material, placed into a recess between two articles, and fused to permanently bond the articles together.

In accordance with the invention, a bifilar resistance element in arbitrarily long lengths is fabricated by covering a pair of electrically conductive wires with a sheath of thermoplastic to provide the starting material from which the heating elements may be fabricated. To form a thermal bonding heating element such as a heating coil for use in bonding a cylindrical pipe to a fitting, the wire-like bifilar resistance element is stripped of the sheath at both ends and joined at one end by soldering, a metallic tab, or other means to make an electrically conductive path. The length is then wound onto a mandrel of appropriate diameter to form a spiral coil having a length corresponding to the length of the recess provided between the parts to be joined. This entire operation may be performed by automated equipment, without the need for costly hand labor.

To join a fitting and a pipe by thermal bonding using the heating element of the invention, the heating element is inserted into a recess provided in the fitting and arranged so that the unjoined ends of the bifilar resistance element extend out of the recess and external to the articles being joined as a pair of leads to be connected to a source of electrical current. The electrical current flows through the coil to generate heat by electrical resistance to fuse the thermoplastic sheath and the adjacent portions of the articles themselves, and upon cooling the articles are joined together as a result of the commingling and bonding of the fused sheath and the fused portions of the articles being joined.

It will be appreciated from the foregoing that the present invention represents an advance in the joining of articles by the thermal bonding technique. Through the use of the bifilar resistance element of the invention, a heating coil or other thermal welding element may be quickly and conveniently fabricated either in a factory or at a field location, utilizing only the basic starting material of a length of the bifilar resistance element. Additionally, it is not necessary to plan the configuration of the thermal heating element with concern for the problem of achieving the necessary electrical connections at a position remote from the application of electrical current, since the circuit may be made simply by stripping the thermoplastic sheath from the pair of wires at a remote location and there joining the stripped wires together.

Other features and advantages of the present invention will become apparent from the following more detailed description taken in conjunction with the accompanying drawings, which illustrate, by way of example, the principles of the invention.

BRIEF DESCRIPTION OF THE DRAWINGS

The accompanying drawings illustrate a preferred embodiment of the invention. In such drawings.

DETAILED DESCRIPTION OF THE PREFERRED EMBODIMENT

Figure 1:
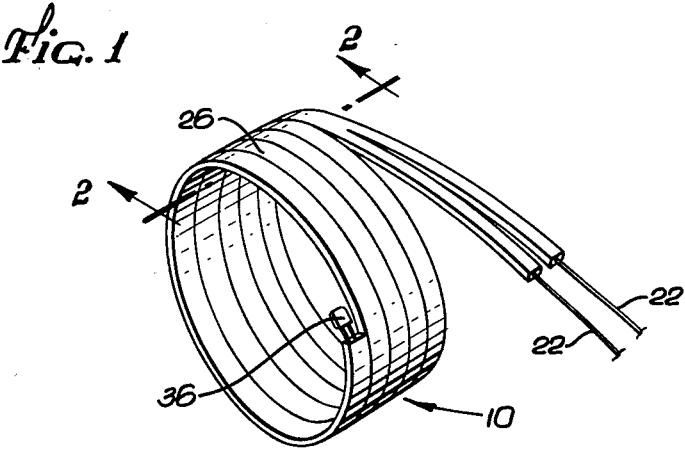
FIG. 1 is a cylindrical spirally wrapped thermal-bonding heating element made in accordance with the present invention.

As is shown in the drawings for purposes of illustration, the present invention is embodied in a spiral heating element 10, for use in thermal bonding of a thermoplastic fitting 12 having a diametrically enlarged portion 14 to an inserted thermoplastic pipe 16, to produce a joint between the two thermoplastic parts. The heating element 10 is placed in an annular recess 18 formed in the inner portion of a wall 20 of the enlarged portion 14 with a pair of leads 22 extending from the recess to the exterior of the fitting. When an electrical current passes into the leads 22, the heating element 10 is heated to fuse a thermoplastic sheath 24 covering the heating element 10 to fill the recess 18 with the thermoplastic material, and to fuse adjacent thermoplastic portions of the wall 20 and the inserted pipe 16, so that the fused thermoplastic from the three sources commingles and forms a bond upon cooling.

In accordance with the invention, a bifilar resistance element 26 having a generally rectangular cross-sectional shape with a long side 28 and a short side 30 comprises two electrically conducting wires 32 and 34 embedded within the thermoplastic sheath 24 to provide a dual conductor path within each length of the bifilar resistance element 26. The bifilar resistance element 26 may be fabricated from wire and a thermoplastic coating material by any of several conventional techniques, such as extrusion of the thermoplastic coating material over the dual wires. In this way, arbitrarily long lengths of the bifilar resistance element 26 may be fabricated and wound onto spools for easy handling.

The materials of construction for the bifilar resistance element 26 depend upon the material composition of the parts to be joined, that is the fitting 14 and the second pipe 16, and it is preferable that the thermoplastic sheath 24 be composed of the same material as the parts to be joined. Although the range of potential thermoplastic polymers is broad, most plastic pipe is made of thermoplastic alphatic hydrocarbon polymers, which fuse at temperatures in the range of 350° F. to 550° F. As an example, polypropylene having a fusing temperature of about 350° F. may be formed as the thermoplastic sheath 24 for use in joining polypropylene fittings and pipes. Other thermoplastic materials include, for example, other polyolefins, fluorocarbon polymers, and other highly solvent-resistant thermoplastics.

Figure 2:
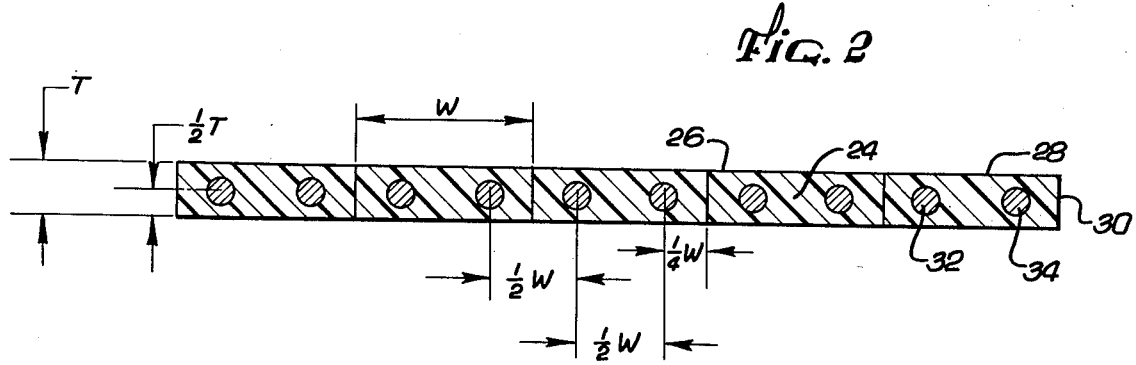
FIG. 2 is an enlarged sectional view of the spirally wrapped heating element of FIG. 1, taken generally along line 2—2 of FIG. 1.
Figure 3:
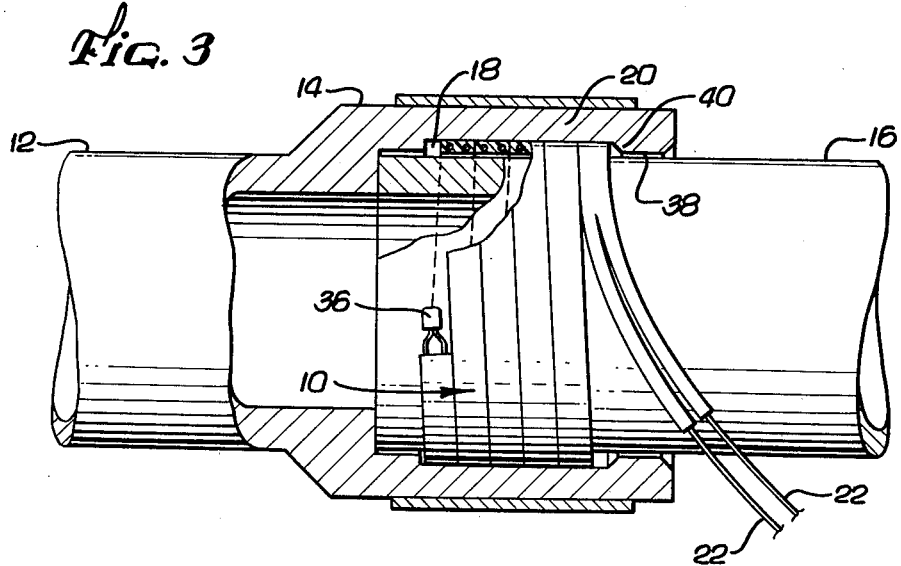
FIG. 3 is a partial sectional view of a joint between a pipe and a fitting prior to the application of electrical current to effect bonding, utilizing the heating element shown in FIG. 1.

The wires 32 and 34 within the thermoplastic sheath 24 are of an electrical conductor material selected as a resistance element, as for example fine copper wire or wire made of iron or iron alloys. The wires 32 and 34 are ordinarily enameled to insulate each individually against contact with the other and neighboring turns during the fusing process. In a preferred embodiment of the invention, the wires 32 and 34 are positioned at the center of the thickness T of the bifilar resistance element 26 and each wire 32 and 34 is positioned one fourth of the width W from the opposing short sides 30 of the bifilar resistance element 26. By placing the wires each at the one-quarter W position, when a length of the bifilar resistance element material is wound to form a spiral heating element, each wire is equidistant from the adjacent wire at a distance of one-half W separation therefrom, as illustrated in FIG. 2.

To form a spiral heating element 10 from a length of the bifilar resistance element 26, the appropriate length is cut from a spool and the portions of the thermoplastic sheath 24 adjacent both ends of the spiral heating element 10 are stripped from the wires 32 and 34 to provide for electrical connections. At the end of the heating element 10 intended to be placed furthest into the recess 18, the pair of wires 32 and 34 are joined by a suitable process to form the wires into a continuous electrically conducting path so that current may flow through the length of the heating element 10. The wires 32 and 34 may be joined by any suitable method, as for example, by a metallic tab 36 pressed onto the wires 32 and 34, as shown in FIG. 1. At the other end of the heating element 10, the pair of leads 22 are split apart to allow convenient handling of the wires 32 and 34 for their attachment to a source of current.

Next, the length of bifilar resistance element 26 is wound into a spiral pattern on a mandrel (not shown) having substantially the same diameter as the inserted pipe 16, so that the resulting heating element 10 will fit closely over the inserted pipe 16. The length of bifilar resistance element 26 is wound onto the mandrel with each succeeding turn around the mandrel wound as closely as possible to the preceding turn, so that there is no space between the turns. As the winding operation proceeds to as many turns as necessary to fill the lengthwise extent of the recess 18, the thermoplastic sheath 24 at the outside surface of the heating element 10 is fused slightly by application of heat to the outside surface so that adjacent turns of the bifilar resistance element 26 are weakly joined together to form a self-sustaining spiral heating element 10. The heating of the outside surface of the heating element 10 is preferably accomplished by a heated metal element or "shoe" (not shown) contacting each turn of the heating element just after it is wound. The term "self sustaining" is used herein to denote a structure which may be removed from the mandrel and handled without losing its as-wound configuration and size. Thus, the self-sustaining spiral heating element 10 may be formed and then later transferred to the location where it will be used to bond the fitting 12 and the second pipe 16 together.

To join the fitting 12 and the inserted pipe 16 by the thermal bonding process, the spiral heating element 10 is formed on a mandrel having substantially the same diameter as the outside diameter of the inserted pipe 16. The annular recess 18 in the inner portion of the wall 20 is dimensioned to have an annular thickness of approximately the same amount T as that of the bifilar resistance element 26. The spiral heating element 10 is then fully received by the recess 18, and the inserted pipe 16 is inserted into the heating element 10 to its desired position for the thermal bonding process. The pair of leads 22 for connection to the electrical current source extends through a gap 38 between a raised shoulder 40 on the wall 20 and the outer diameter of the inserted pipe 16.

Electrical current is passed through the heating element 10 until it is observed that the thermoplastic sheath 24 has fused, expanded to fill the recess 18 and encapsulate the tab 36, and then extruded out of the recess 18 through the gap 38. It is important that the thermoplastic fill the recess 18 completely, and the rectangular shape of the exterior of the bifilar resistance element 26 allows the adjacent turns of the heating element 10 to contact each other with a minimum of unfilled space that might produce air bubbles after fusing is complete. After heating, the electrical current is turned off and the thermoplastic material allowed to cool and harden, thereby bonding the fitting 12 to the inserted pipe 16. The heat generated to fuse the thermoplastic sheath 24 is also transmitted in part to the adjacent portions of the wall 20 and the second pipe 16, which, being of the same or similar thermoplastic material as the thermoplastic sheath 24, are fused in the areas immediately adjacent the recess 18. The fused material from the thermoplastic sheath 24 commingles with and bonds to the thermoplastic material of the wall 20 and the inserted pipe 16, thereby assuring a bond between the fitting 12 and the inserted pipe 16.

It will now be appreciated that, through the use of this invention, the bifilar resistance element 26 may be formed into the heating element 10 for use in thermal bonding of thermoplastic articles. In forming the heating element 10 the dual-wire construction of the bifilar resistance element 26 allows the spiral heating element 10 to be made with as many turns as necessary to fill the lengthwise extent of the recess 18, yet still achieve a completed electrical circuit simply by stripping the thermoplastic sheath 24 and attaching the tab 36 at the portion of the heating element 10 remote from the external connection to the electrical source, thereby avoiding the need for any crossover connections or preformed elements. It is emphasized particularly that the entire process of forming the bifilar resistance element 26, stripping the sheath 24 from the ends of the wires 32 and 34, attaching the tab 36, splitting the opposite ends of the wies 32 and 34 apart, and winding and fusing the outer surface to form a self-sustaining coil may be performed by fully automated machinery, thus keeping costs low.

Although a particular embodiment of the invention is described in detail for purposes of illustration, various embodiments may be made without departing from the spirit and scope of the invention. Accordingly, the invention is not to be limited except by the appended claims.

I claim:

1. A spiral bifilar welding sleeve for positioning between two thermoplastic members to be bonded together, said sleeve comprising;
   an elongated thermoplastic sheath of generally rectangular cross-section, having a pair of short sides and a pair of long sides;
   a pair of electrically conductive wires embedded within said sheath in a spaced, generally parallel relationship; and
   coupling means for electrically coupling said wires together at one end of said sheath, said wires at the other end being adapted for connection to an electrical current source, said sheath being wound into a plurality of turns defining a generally spiral coil with the short sides of adjacent turns being bonded together, said sheath being fusible when electrical current is passed through said wires to bond the thermoplastic members with respect to each other.

2. The spiral welding sleeve of claim 1, wherein said wires are spaced inwardly respectively from the opposite short sides of said sheath by a distance of about one fourth the length of the long sides.

3. The spiral welding sleeve of claim 1, wherein said coupling means comprises a metallic tab pressed onto said wires at said one end of said sheath.

4. The spiral welding sleeve of claim 1, wherein said other end of said sheath is split apart to separate said wires to allow convenient handling for connection to the electrical source.

5. The spiral welding sleeve of claim 1, wherein said thermoplastic sheath is extruded over said wires.

6. The spiral welding sleeve of claim 1, wherein said thermoplastic sheath is comprised of the same material as the two thermoplastic members.

7. The spiral welding sleeve of claim 1, wherein said wires define a plane substantially parallel to the long sides and perpendicular to the short sides.

8. The spiral welding sleeve of claim 1, wherein each of said wires in adjacent turns of the spiral coil are generally equidistant from each other.

9. The spiral welding sleeve of claim 1, wherein said sheath is wound into a spiral coil on a mandrel.

10. The spiral welding sleeve of claim 9, wherein said mandrel is heated on its outside surface such that the short sides of adjacent turns of said sheath are fused to retain said sleeve in a self-sustaining spiral coil.

11. A spiral bifilar welding sleeve for positioning between two thermoplastic members to be bonded together, said sleeve comprising:
   an elongated thermoplastic sheath of generally rectangular cross-section, having a pair of short sides and a pair of long sides;
   a pair of electrically conductive wires embedded within said sheath in a generally parallel relationship, said wires being spaced inwardly respectively from the opposite short sides of said sheath by a distance of about one fourth the length of the long sides; and
   coupling means for electrically coupling said wires together at one end of said sheath, said wires at the other end being adapted for connection to an electrical current source, said sheath being wound into a plurality of turns defining a generally spiral coil with the short sides of adjacent turns being bonded together, said sheath being fusible when electrical current is passed through said wires to bond the thermoplastic members with respect to each other.

12. The spiral welding sleeve of claim 11, wherein said wires define a plane substantially parallel to the long sides and perpendicular to the short sides.

13. The spiral welding sleeve of claim 11, wherein each of said wires in adjacent turns of the spiral coil are generally equidistant from each other.

* * * * *